Jan. 4, 1938.  J. J. SCHAEFER  2,104,496

FASTENING DEVICE

Filed Feb. 28, 1935

Inventor

Justus J. Schaefer,

By Edward E. Clement Attorney

Patented Jan. 4, 1938

2,104,496

UNITED STATES PATENT OFFICE 2,104,496

FASTENING DEVICE

Justus J. Schaefer, Great Barrington, Mass.

Application February 28, 1935, Serial No. 8,624

4 Claims. (Cl. 20—92)

My invention relates to fastening devices and has for its object the production of such a device which will be particularly adapted for use in joints like those in furniture which are exposed to severe strain and require the maintenance of tensile strength in their joints at all times and under all conditions.

I attain my object by making use of a material I have discovered which has tensile strength at one hundred per cent under all conditions of distortion and strain. This material is rawhide which I prepare in a manner to be described hereinafter and while I shall claim its use particularly in furniture, I shall also point out in the claims some other uses.

My invention is illustrated in the accompanying drawing, in which.

Figure 1:
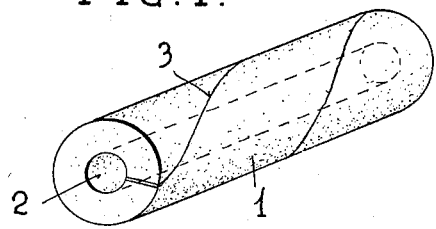
Figure 1 is a perspective view of a twisted rawhide plug shown with a tapering bore to accommodate a wooden dowel pin or machine screw.

Referring more in detail to the drawing, No. 1 shows a rawhide sleeve twisted to form a helical slit extending the length thereof as it appears before it is inserted in a socket to be applied as a fastener. It may be formed with or without a tapering bore 2, and twisted either to the right or left as desired. If a screw is used to expand the sleeve it is doubly effective to use a left hand twisted sleeve or plug, as the action of the right hand threads of the screw will tend to expand the sleeve by parting the helical slit 3 to a greater extent than if expanded with the said slit.

Figure 3:
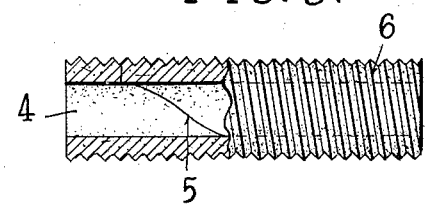
Figure 3 is a view of a twisted piece of rawhide, part in section and part in side elevation, showing threads cut into the rawhide itself for threaded engagement with a socket.

Figure 3 is a rawhide sleeve or plug which may be made with or without the bore 4, having a helical slit 5 adapted to be threaded into a screw socket not shown, by means of threads 6. These threads 6 may be cut by the threads of the socket itself if desired, as the rawhide while being very tough and of great tensile strength will also respond to pressure by flowing and conforming to the surrounding socket walls, and yet not lose its tensile strength due to flow as occurs in the case of lead or any other fluent material heretofore discovered for this purpose.

Figure 4:
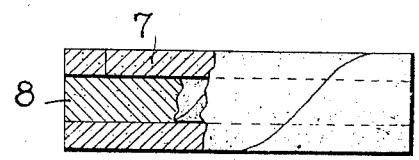
Figure 4 is a view of a twisted piece of rawhide part in section and part in side elevation to show a solid rolled rawhide plug inserted within a rawhide sleeve for expansion.

Figure 4 illustrates a fastener made completely of rawhide elements, in which a solidly twisted rawhide dowel or plug replaces the wooden dowel, the screw or the nail, for expanding the sleeve 7 when placed in a socket of some sort. No. 7 is a twisted rawhide sleeve as in Figure 1, with the bore straight or tapering into which is inserted a solid rawhide dowel pin or plug 8. The smaller solid mass of rawhide 8, which is made of twisted rawhide is expansible and further made so by the helical slit formed therein by the twisting process. The dowel 8 may be made slightly larger in diameter than the internal diameter of the sleeve 7 to further provide for additional expansion and greater holding power. It is not necessary, however, to make the twisted mass 8 with a diameter larger than the bore of sleeve 7, unless there is to be extreme tension thereon as the rawhide itself will expand when subjected to moisture or weather conditions. However, due to the extreme ductility of the material used for my invention, when under tension the material may be subjected to great deformation before fracture, and it is therefore preferable to insert the rawhide dowel 8 with a larger diameter than the internal diameter of the sleeve 7.

Figure 5:
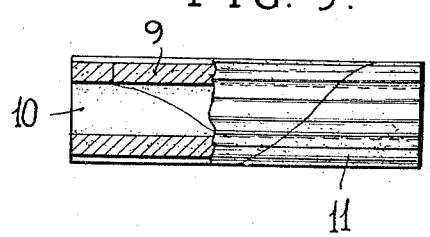
Figure 5 is a view similar to Figure 3 except for the longitudinal ribs formed from the rawhide.
Figure 6:
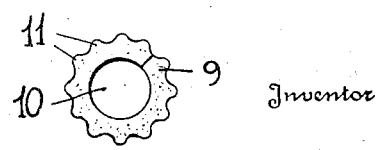
Figure 6 is an end view of Figure 5 showing the ribs.

Figures 5 and 6 illustrate a rawhide sleeve or plug 9 with or without the bore 10, having ribs 11 formed in the surface of the sleeve or plug's outside diameter. These ribs will engage the walls of a socket into which the sleeve or plug is inserted and provide for a greater resistance to tensile stress upon the fastener, whether it be screw, nail, wooden dowel or rawhide. It has been found in reducing this to practice that the screw or nail will break before the rawhide sleeve or plug will loosen or fracture, so great is its expansion and tensile strength.

I will now continue and describe one of the few actual uses and applications of a rawhide fastener.

Figure 7:
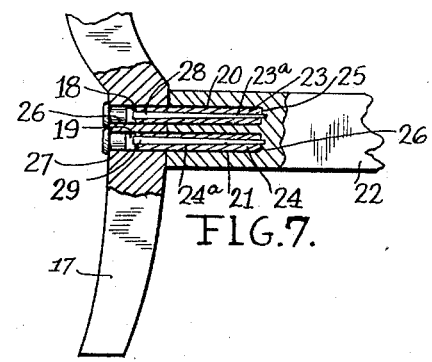
Figure 7 is a view part in section showing a rawhide sleeve cooperating with a dowel pin for use in jointing furniture.
Figure 2:
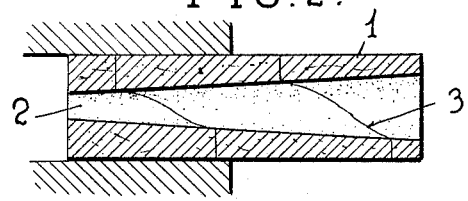
Figure 2 is a longitudinal cross sectional view of Figure 1.

Figure 7 illustrates the use of rawhide for making joints for furniture. No. 17 represents the leg of a chair or sofa and No. 22 is one of the cross braces between the legs 17. The leg 17 has two sockets 18 and 19 bored through it so as to align with the sockets 20 and 21 bored in the cross brace 22. The legs 17 and the brace 22 are placed together so that the bores 17 and 20 and 19 and 21 line up to form an elongated socket. Rawhide sleeves 23 and 24 are now placed in each of the elongated sockets. The rawhide sleeves 23 and 24 are made preferably of a length shorter than the length of the elongated sockets, so as to provide for an unobstructed portion or small sockets 27 in the elongated sockets formed from the sockets 18 and 20 and 19 and 21, when the rawhide sleeves are driven their length to the ends of each elongated socket. The end of each socket is in the connecting brace 22 as illustrated at 25 and 26. The rawhide sleeves 23 and 24 being of shorter length than the elongated sockets extend to a distance short of the width of the leg 17 in the sockets 18 and 19 respectively, so as to provide for still shorter sockets 26 and 27 on the outside of the leg 17. The short sockets 26 and 27 are left open until after the insertion of the expanding dowel pins 28 and 29 which are driven into the bores 23a and 24a of the respective rawhide sleeves 23 and 24. The dowel pins 28 and 29 will expand the rawhide against the walls of the elongated sockets throughout their entire length of contact with the elongated sockets' walls, and develop an exceptionally strong fastening connection between the leg 17 and the cross brace 22. Chairs having legs fastened with rawhide fastenings as hereinbefore explained will not weaken and break as the usual chair when rocked back upon the two rear legs as is often done by thoughtless sitters. And generally furniture joined in this fashion will stand extremely rough usage.

What I claim is:—

1. A coupler for furniture comprising a helically slit rawhide plug adapted to be expanded into aligned sockets in the frame.

2. A joint including frame members to be secured together and provided with aligned sockets in combination with a helically slit rawhide coupler expanded in said sockets.

3. A joint including frame members to be secured together and provided with aligned sockets in combination with a helically slit rawhide coupler expanded in said sockets, together with expanding means extending into the coupler from the outside of the frame.

4. A joint including frame members to be secured together and provided with aligned sockets in combination with a helically slit rawhide coupler expanded in said sockets, in which the frame includes leg members and the coupling and expanding members extend into the frame through the legs.

JUSTUS J. SCHAEFER.